United States Patent
Sharp

[19]

[11] Patent Number: 5,971,737
[45] Date of Patent: Oct. 26, 1999

[54] ELECTRICALLY DRIVEN PLUNGER FOR TRANSFER MOLDING PRESS

[75] Inventor: Richard K. Sharp, New Hope, Pa.

[73] Assignee: Hull/Finmac, Warminster, Pa.

[21] Appl. No.: 08/678,257

[22] Filed: Jul. 11, 1996

[51] Int. Cl.⁶ ................................... B29C 45/77
[52] U.S. Cl. .......................... 425/145; 264/40.7; 425/149; 425/544
[58] Field of Search ................................... 425/145, 149, 425/544; 264/40.7

[56] References Cited

U.S. PATENT DOCUMENTS

| | | | |
|---|---|---|---|
| 2,556,795 | 6/1951 | Cannon | 425/544 |
| 4,386,898 | 6/1983 | Sera | 425/145 |
| 4,388,265 | 6/1983 | Bandoh | 425/544 |
| 4,812,114 | 3/1989 | Kennon et al. | 425/544 |

*Primary Examiner*—Tim Heitbrink
*Attorney, Agent, or Firm*—Olson & Olson

[57] ABSTRACT

The injection of synthetic resin into the cavities of a plastic molding press is provided by a plurality of electrically driven plunger mechanisms each of which includes an elongated rotary screw connected to the output of an electric motor. The screw is threaded operatively to an elongated plunger which extends into the fixed mold and is arranged to support a pill or preform for injection into the runner leading to one or more mold cavities. The electric motor of each plunger mechanism is controlled by a computer program which is capable of varying the velocity and pressure delivery of material to the mold, as well as adjusting the temperature of the mold.

6 Claims, 3 Drawing Sheets

ELECTRICALLY DRIVEN PLUNGER FOR TRANSFER MOLDING PRESS

BACKGROUND OF THE INVENTION

This invention relates to transfer molding of synthetic resins, and more particularly to a novel electrically driven plunger mechanism for multi-plunger transfer molding presses.

The plunger mechanism for transfer molding presses heretofore has included an extensible fluid pressure piston-cylinder unit for each plunger, supplied with fluid pressure from a common source. This not only incurs the high cost of hydraulic power equipment and the plant space for it, it also imposes serious limitations on the control of plunger velocity and pressure, creates a noisy environment containing hydraulic fluid fumes and requires lubrication with consequent discharge of oil vapor. In multiple plunger systems utilizing either fluid pressure or electrical power for driving the plungers, no one has provided individual control of plunger velocity and pressure.

SUMMARY OF THE INVENTION

This invention provides an electrically driven plunger for a transfer molding press, wherein the electric drive includes means for controlling the velocity of movement of the plunger and the pressure of plunger application in a mold.

It is the principal objective of this invention to overcome the aforementioned limitations and disadvantages of prior hydraulically and electrically driven plungers of transfer molding presses.

Another objective of this invention is the provision of an electrically driven plunger of the class described that enables the assembly of a multi-plunger transfer molding press with independent control of time, temperature, pressure and materials performance of each plunger.

Still another objective of this invention is to provide an electrically driven plunger of the class described that enables the assembly of a multi-plunger transfer molding press operable in class 10,000 to class 1,000 clean room environments.

Yet another objective of this invention is the provision of an electrically driven plunger of the class described that enables precision encapsulation of semi-conductor devices.

A further objective of this invention is the provision of an electrically driven plunger of the class described that enables fast and easy mold changeover and set up of the assembly of a multi-plunger transfer molding press.

A still further objective of this invention is the provision of an all-electric multi-plunger transfer molding press with independent velocity and pressure control of each plunger by a programmed computer.

The foregoing and other objects and advantages of this invention will appear from the following detailed description, taken in connection with the accompanying drawings of a preferred embodiment.

DESCRIPTION OF THE PREFERRED EMBODIMENT

Figure 1:
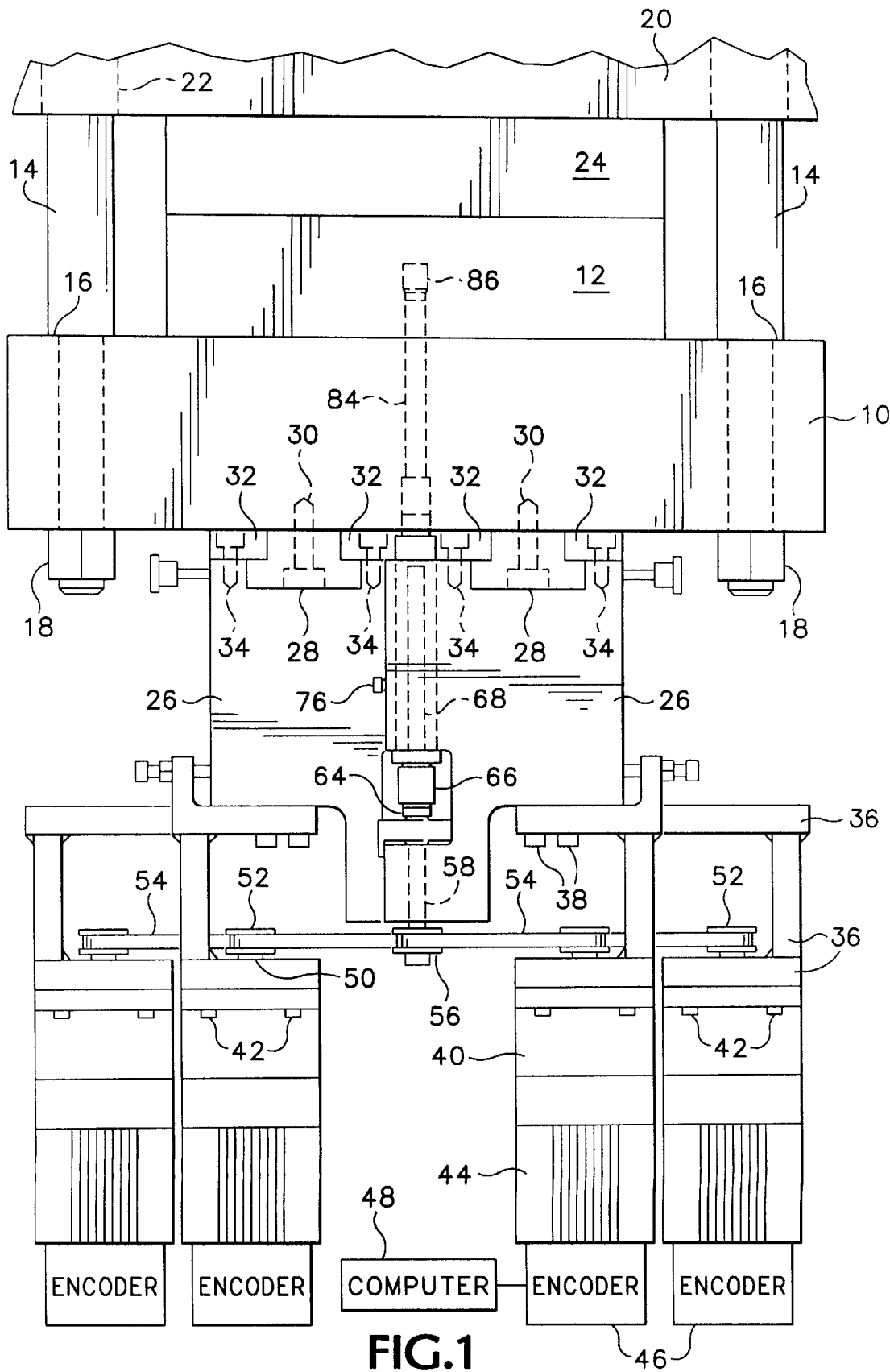
FIG. 1 is a fragmentary vertical elevation of a transfer molding press showing a plurality of the electrically driven plunger assemblies embodying the features of this invention.

The multi-plunger transfer molding press illustrated in the drawings includes a fixed platen 10 supported by framework (not shown) supported on an underlying floor. The platen 10 mounts a lower fixed mold 12. Vertically elongated guide rods 14 are secured to the lower platen by extending the lower reduced diameter portion of the guide rods through corresponding corner holes in the platen and tightening the guide rods at the upper shoulder 16 by tightening the lower nut 18.

The movable upper platen 20 is provided with corner guide bores 22 which receive the guide rods 14 therethrough, for guiding the movement of the upper platen and the associated upper movable mold 24. Movement of the upper platen and mold assembly is afforded by conventional drive mechanism, preferably by electric motor power.

A housing 26 for each plunger assembly is mounted on the underside of the fixed platen 10 by a gib 28 secured to the fixed platen by screws 30. The gib serves to support the housing extending vertically downward from the fixed platen 10, by the suspending gib rails 32 which are secured to the housing by the screws 34.

An electric drive motor mount 36 is secured to the housing by screws 38 and serves to mount the electric drive motor gearhead 40 by the screws 42. The gearhead is coupled to the electric drive motor 44 which is connected electrically to the encoder 46 which, in turn, is connected electrically to computer 48.

The gearhead output shaft 50 mounts a timing pulley 52 over which is trained a timing belt 54. The belt also is trained over timing pulley 56 secured to plunger drive shaft 58 which is mounted for rotation in bearings 60 in housing 26. A load cell 62 is located above the upper bearing 60, and a thrust washer 64 separates the load cell from coupling 66 which connects the upper end of the drive shaft 58 to the bottom end of an elongated drive screw 68. The drive screw extends through an axial bore in an elongated plunger 70 which is received for sliding movement in an elongated guide bore 72 in the housing 26. A ball nut 74 is mounted in the guide bore 72 and is in threaded engagment with the drive screw 68. The ball nut is keyed to the plunger which is secured in the guide bore 72 against axial rotation by means of a guide screw 76. The guide screw is secured removably in a threaded hole in the housing and extends into an elongated slot 78 in the housing 26. Thus, with the plunger 70 and ball nut 74 secured against axial rotation, rotation of the drive screw 68 effects axial moevement of the plunger and ball nut along the length of the drive screw.

The upper end of the plunger projects through the top end of the housing 26 and secures the male quick disconnect fitting 80 thereto. The cooperating female quick disconnect fitting 82 is secured to the lower end of an elongated connecting rod 84, the upper end of which is provided with a plunger tip 86.

Figure 2:
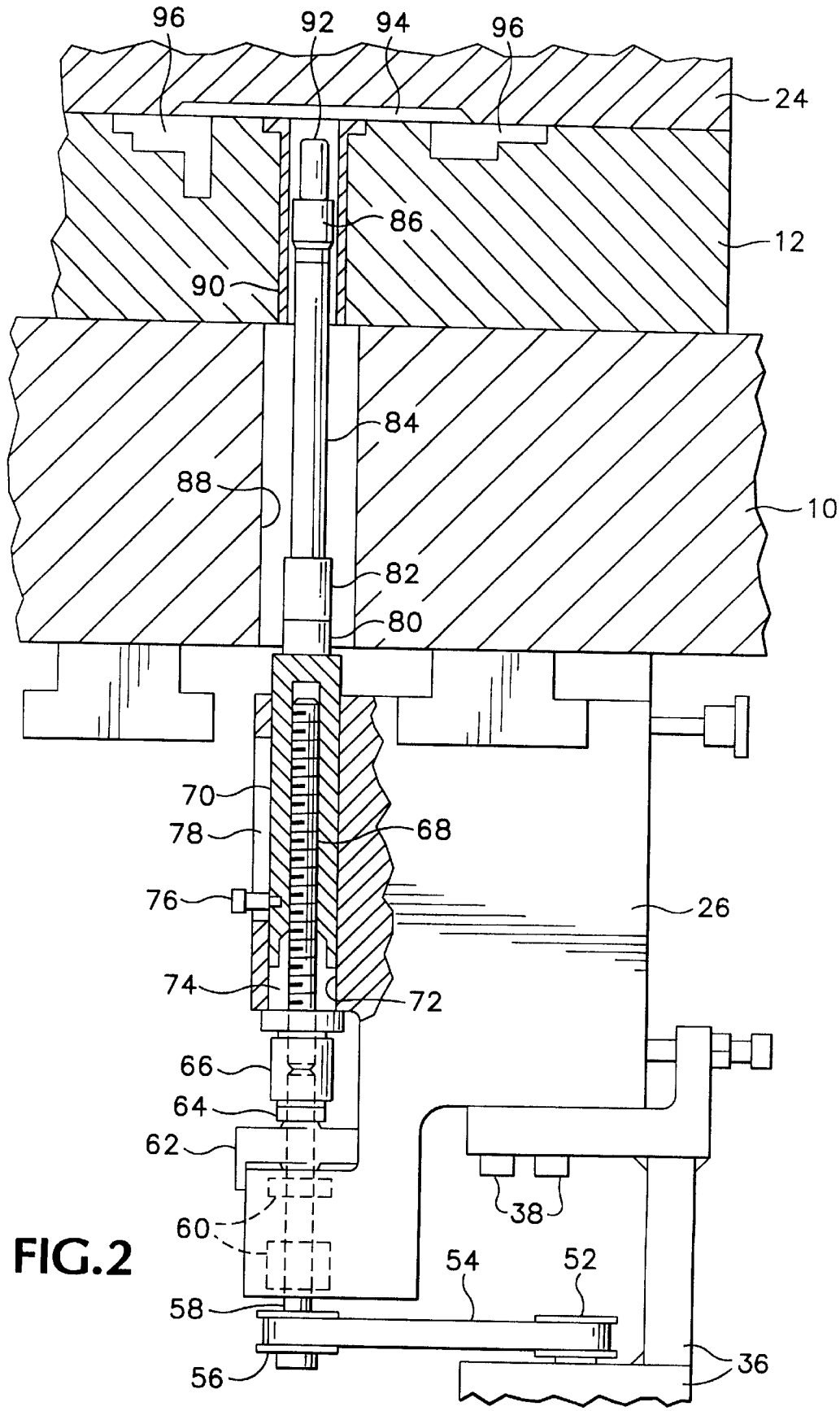
FIG. 2 is a fragmentary vertical elevation, on an enlarged scale, of the majority portion of one of the plunger assemblies of FIG. 1, parts being shown in section to disclose inner structural details.

Referring primarily to FIG. 2 of the drawings, an elongated slot 88 (FIG. 3) is provided through the fixed platen 10 in vertical alignment with the plunger guide bore 72 of each plunger assembly. A bore through the fixed mold 12, in the form of a pot 90, is arranged in axial alignment with the bore 72 and slot 88. Accordingly, each elongated assembly of plunger 70, connecting rod 84 and tip 86 extends upwardly through the aligned bores, with the plunger tip 86 terminating within its associated pot 90.

The plunger tip 86 functions to support a pill or preform 92 of synthetic resin which, upon upward movement of the plunger assembly, by axial rotation of the drive screw 68, effects injection of the synthetic resin under pressure and in fluid condition, through the runner 94 in the movable mold 24 and thence into the parts forming cavities 96 in the fixed mold 12.

Although operation of the plunger assembly described hereinbefore may be achieved by hand manipulation of electrical controls, the preferred method of control is through the encoder 46 and computer 48. The computer is programmed to receive electrical signals from the load cell 62 and temperature measuring thermocouples in the molds 12 and 24, and to send electrical signals to the encoder 46 to adjust speed and pressure application of the plunger assembly to the mold.

It is to be understood that the computer program is selected to provide the desired magnitudes of control parameters for particular products and synthetic resins.

Figure 3:
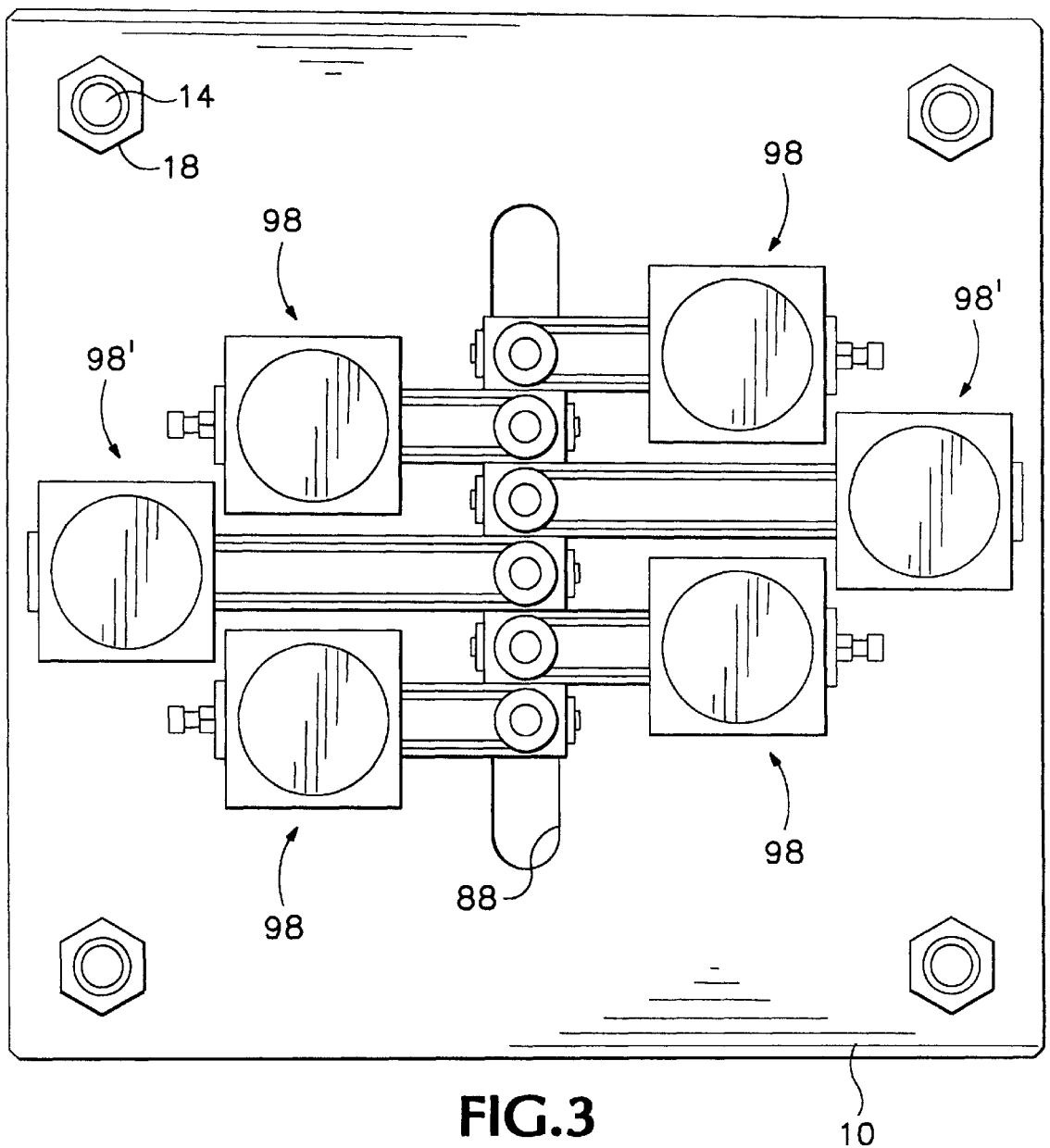
FIG. 3 is a plan view of a multiple plunger assembly as viewed from the bottom in FIG. 1.

Referring to FIG. 3 of the drawings, therein is illustrated an arrangement of six separate, electrically driven plunger assemblies 98 mounted in a row on the fixed platen 10. Because of the large size of the drive motor assembly, two of the six plunger assemblies 98' require the drive motor assemblies to be displaced laterally farther from the axis of the drive screw and plunger assembly than the other four plunger assemblies, to accommodate the larger dimensions of the drive motor assemblies. This merely involves the provision of a longer motor mount 36 and timing belt 54 for the two units. It is by this means that a plurality of the plunger assemblies may be mounted on a transfer molding press in a minimum of space.

From the foregoing it will be appreciated that the present invention provides a transfer molding press with a novel electrically driven plunger assembly which may be mounted in multiples in a minimum of space for totally independent control of the operating parameters of each unit, independent of the others. The all-electric systems allow the press to be operated in class 10,000 to class 1,000 clean room environments. Hydraulic fluid fumes associated with conventional hydraulically driven systems, are eliminated, and the absence of lubrication requirements eliminates the possibility of oil vapor discharge. Environmental noise levels are significantly lower than those of hydraulic systems. The computer-based closed-loop controls assure quality, accuracy and repeatability. Unlike spring controlled plungers mounted in series, the individually motor driven plungers of this invention respond automatically and virtually instantaneously to any departure from set point tolerances. Mold changeover and set up is fast and easy.

It will be apparent to those skilled in the art that various changes may be made in the size, shape, type, number and arrangement of parts described hereinbefore, without departing from the spirit of this invention and the scope of the appended claims.

I claim:

1. In combination with a plastic molding press having a fixed platen supporting a fixed mold and a movable platen supporting a mold for movement toward and away from the fixed mold, a plunger assembly comprising:

a) a housing mounted on the fixed platen, b) axially aligned passageways in the housing, fixed platen and mold, c) an elongated plunger movable in said aligned passageways, the end of the plunger in the mold being arranged to support synthetic resin for injection into a cavity in the mold, d) an elongated rotary screw in said housing in operative threaded engagement with said plunger for moving said plunger axially in said passageways, e) an electric motor mounted on said housing, f) coupling means interengaging said electric motor and said rotary screw for rotating said rotary screw by activation of said motor, and g) control means connected to said electric motor for controlling rotation of said motor.

2. The combination of claim 1 wherein said coupling means includes pressure measuring means for measuring resistance to injection of synthetic resin into a cavity in the mold.

3. The combination of claim 2 wherein said pressure measuring means comprises a load cell.

4. The combination of claim 1 wherein said control means includes a computer programmed to vary at least one of rotational speed of the drive motor, pressure of resin injection into the mold and temperature of the mold.

5. The combination of claim 1 wherein there are a plurality of plunger assemblies, the housings of which are mounted on the fixed platen in spaced apart relationship, and each is arranged for injecting synthetic resin into a mold cavity different from the other plunger assemblies.

6. The combination of claim 5 wherein the housings are arranged to space the electric motors laterally from the longitudinal axis of the plunger to different distances, to minimize the spacing between plungers in the fixed platen.

\* \* \* \* \*